(12) United States Patent
Patil et al.

(10) Patent No.: US 11,493,085 B1
(45) Date of Patent: Nov. 8, 2022

(54) METHOD AND SYSTEM FOR HYBRID BEARING DESIGN

(71) Applicant: The Texas A&M University System, College Station, TX (US)

(72) Inventors: Abhay R. Patil, College Station, TX (US); Robert B. Hure, San Luis Obispo, CA (US); Adolfo Delgado Marquez, College Station, TX (US); Burak C. Ayyildiz, College Station, TX (US); Wenjie Yin, College Station, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 16/883,135

(22) Filed: May 26, 2020

(51) Int. Cl.
*F16C 17/24* (2006.01)
*F16C 33/04* (2006.01)
*F16C 27/02* (2006.01)
*F16C 17/02* (2006.01)

(52) U.S. Cl.
CPC ............ *F16C 17/246* (2013.01); *F16C 27/02* (2013.01); *F16C 33/043* (2013.01); *F16C 17/02* (2013.01); *F16C 2206/40* (2013.01)

(58) Field of Classification Search
CPC ........ F16C 17/02; F16C 17/246; F16C 27/02; F16C 33/042; F16C 33/20–208; F16C 35/02; F16C 2206/40
See application file for complete search history.

(56) References Cited

U.S. PATENT DOCUMENTS

| | | | | |
|---|---|---|---|---|
| 4,286,894 | A * | 9/1981 | Rongley | F16C 27/02 403/372 |
| 6,702,468 | B2 * | 3/2004 | Rennett | F04D 29/0465 384/296 |
| 7,580,225 | B2 * | 8/2009 | Hanrahan | F16C 27/00 360/265.6 |
| 2016/0053807 | A1 * | 2/2016 | Maciver | F16C 35/02 384/472 |
| 2017/0314618 | A1 * | 11/2017 | Speckert | F16C 33/043 |
| 2020/0181979 | A1 * | 6/2020 | Gharib | F16C 23/041 |
| 2021/0148407 | A1 * | 5/2021 | Werner | F16C 33/046 |

* cited by examiner

*Primary Examiner* — Alan B Waits
(74) *Attorney, Agent, or Firm* — Winstead PC

(57) ABSTRACT

A hybrid bearing assembly includes a bushing. A sleeve is rotationally disposed within the bushing and a support layer is disposed around an outer perimeter of the bushing. A protective sleeve is disposed abutting the sleeve. A protective bushing is disposed abutting the bushing.

15 Claims, 6 Drawing Sheets

|  | Silicon Carbide | Thermoplastic |
|---|---|---|
| Wear | Acceptable | Deficient |
| Dynamic Response | Acceptable | Deficient |
| Brittleness | Deficient | Acceptable |
| Dry run condition | Acceptable | Deficient |
| Good | Acceptable | Deficient |

FIG. 1

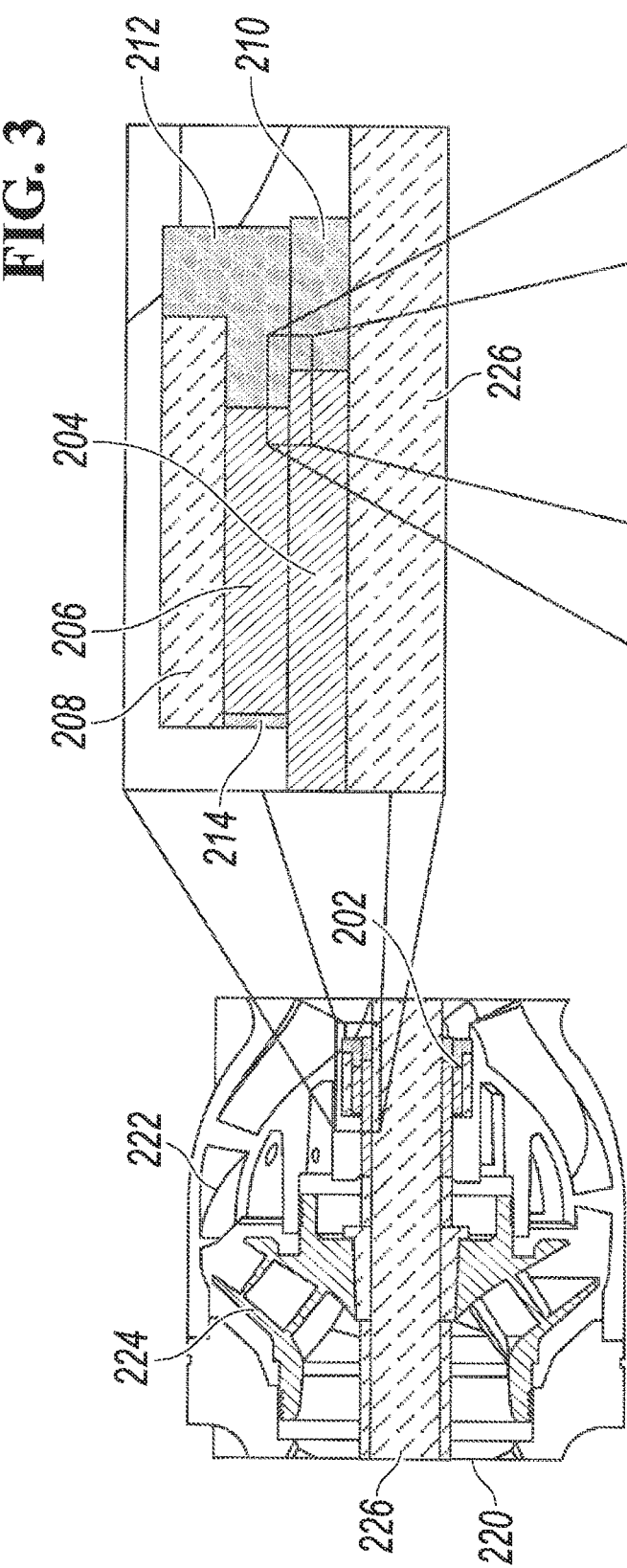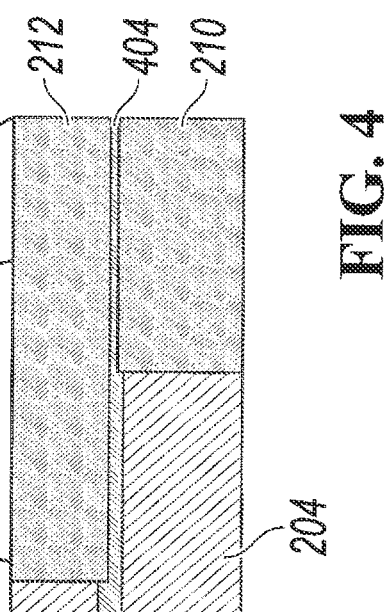

METHOD AND SYSTEM FOR HYBRID BEARING DESIGN

TECHNICAL FIELD

The present disclosure relates generally to rotational bearings and more particularly, but not by way of limitation, to hybrid bearings having a wear-resistant layer and a damping layer that reduces fracturing of the wear-resistance layer and improves dynamic performance of the bearing.

BACKGROUND

This section provides background information to facilitate a better understanding of the various aspects of the disclosure. It should be understood that the statements in this section of this document are to be read in this light, and not as admissions of prior art.

Fluid film bearings are frequently utilized in applications such as pumps and turbomachinery. Fluid film bearings must support rotating components and damp vibrations without over-constraining the shaft radial motion. The functions of fluid film bearings may also include preventing leakage and producing the desired displacement response that protects components from wear. In the particular case of submersible pumps, bearings provide a seal to prevent infiltration of fluid through secondary flow passages between pump stages. Fluid film bearings are often constructed from wear-resistant materials. However, these materials are often brittle and subject to fracture during transportation, installation, and operation.

SUMMARY

This summary is provided to introduce a selection of concepts that are further described below in the Detailed Description. This summary is not intended to identify key or essential features of the claimed subject matter, nor is it to be used as an aid in limiting the scope of the claimed subject matter.

Aspects of the disclosure relate to a hybrid bearing assembly. The hybrid bearing assembly includes a bushing. A sleeve is rotationally disposed within the bushing and a support layer is disposed around an outer perimeter of the bushing. A protective sleeve is disposed abutting the sleeve. A protective bushing is disposed abutting the bushing.

Various aspects of the disclosure relate to a hybrid bearing assembly. The hybrid bearing assembly includes a bushing. A sleeve is rotationally disposed within the bushing. A vibration-absorbing element is disposed between the bushing and the sleeve.

Aspects of the disclosure relate to a pump. The pump includes an intake and a diffuser fluidly coupled to the intake. A shaft is disposed through the intake and the diffuser and an impeller is coupled to the shaft and rotationally disposed between the intake and the impeller. A bushing is disposed in the diffuser. A sleeve is rotationally disposed within the bushing and coupled to the shaft. A support layer is disposed around an outer perimeter of the bushing between the bushing and the diffuser. A protective sleeve is coupled to the shaft abutting the sleeve. A protective bushing abuts the bushing.

Aspects of the disclosure relate to a method of assembling a hybrid bearing assembly. The method includes coupling a support layer to a diffuser and positioning a bushing within the support layer. The method includes coupling a sleeve to a shaft such that the sleeve is positioned within the bushing. A protective sleeve is positioned on the shaft such that the protective sleeve abuts the sleeve. A protective bushing is positioned in the diffuser such that the protective bushing protects the bushing and the support layer.

BRIEF DESCRIPTION OF THE DRAWINGS

A more complete understanding of the subject matter of the present disclosure may be obtained by reference to the following Detailed Description when taken in conjunction with the accompanying Drawings wherein:

FIG. 1 is a table comparing various bearing material characteristics;

FIG. 2 is a cross-sectional view of a submersible pump illustrating a hybrid bearing assembly installed therein according to aspects of the disclosure;

FIG. 3 is a cross-sectional view of a hybrid bearing assembly according to aspects of the disclosure;

FIG. 4 is a detail view of the hybrid bearing assembly illustrating relative clearances according to aspects of the disclosure;

DETAILED DESCRIPTION

Figure 5A:
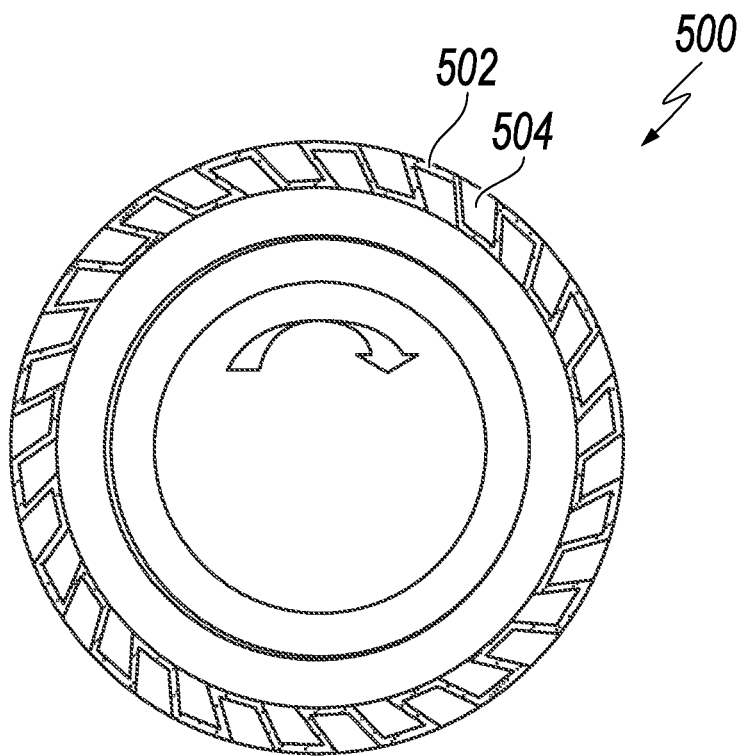
FIG. 5A is an axial view of a hybrid bearing assembly including a vibration-absorbing element according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

Turbomachines, such as pumps, compressors, and turbines frequently utilize bearings constructed, for example, from carbide materials such as tungsten carbide or silicon carbide, soft materials such as, for example, bronze, thermoplastic materials, or tin or lead-based bearing alloys (also known as white metal or Babbitt metal) over a metal substrate. While soft materials provide good lubricity, can handle intermittent contact, and allow embedding of particles, soft materials will wear rapidly under sustained contact and under high concentrations of particles such as sand. Carbide materials are capable of operating at loads beyond bearing hydrodynamic limit (boundary lubrication) and can handle high concentrations of particles while exhibiting very low wear rate. However, carbide materials are often brittle and susceptible to fracture during, for example, installation, transportation, or excessive vibration levels. In contrast, bearings constructed from thermoplastic materials wear very quickly but are less brittle and, thus, less prone to fracturing. For example, the toughness (that is, the ability of a material to absorb energy without fracturing) of ceramics such as tungsten carbide is under 0.1 kJm², while the toughness of polymers and composites such as thermoplastics are often 10 to 100 times higher. FIG. 1 is a table comparing various bearing material characteristics. FIG. 1 illustrates that bearings constructed from carbide materials exhibit consistently lower wear rate and better dynamic response and dry-run performance than bearings constructed of thermoplastic materials. On the other hand, thermoplastic bearings exhibited lower brittleness leading to improved fracture resistance.

FIG. 2 is a cross-sectional view of a submersible pump 200 illustrating a hybrid bearing assembly 202 installed therein. The submersible pump 200 includes an intake 220 and a diffuser 222. An impeller 224 is mounted on a shaft 226. The hybrid bearing assembly 202 is positioned between the shaft 226 and the diffuser 222 and prevents wear of the shaft 226 or the diffuser 222. By way of example, the submersible pump 200 is illustrated in FIG. 2; however, in other embodiments, the hybrid bearing assembly 202 may be utilized in any rotational device requiring bearings including, for example, compressors, turbines, non-submersible pumps, or other similar devices.

FIG. 3 is a cross-sectional view of the hybrid bearing assembly 202. The hybrid bearing assembly 202 includes a sleeve 204 that is coupled to the shaft 226. A bushing 206 is mounted in the diffuser 222 and, when assembled, aligns with the sleeve 204 such that the sleeve 204 bears against the bushing 206 during rotation of the shaft 226. In various embodiments, the sleeve 204 and the bushing 206 are constructed from a wear-resistant material such as, for example, tungsten carbide, silicon carbide, or other ceramic materials. In various embodiments, the sleeve 204 and the bushing 206 are coupled to the shaft 226 and the diffuser 222, respectively, via a press fit; however, in other embodiments, other methods of joining the sleeve 204 and the bushing 206 to the shaft 226 and the diffuser 222, respectively, could be utilized. For example, in various embodiments, the sleeve 204 and the bushing 206 could be joined to the shaft 226 and the diffuser 222, respectively, via an adhesive or other type of chemical bonding, or via a process such as, for example, welding, brazing, sintering, or the like. The hybrid bearing assembly 202 also includes a support layer 208 that is positioned between the bushing 206 and the diffuser 222. In various embodiments, the support layer 208 is secured between the diffuser 222 and the bushing 206 via a press fit; however, in other embodiments, the support layer 208 may be integral to the bushing 206 or connected via mechanical means or chemical bonding. In various embodiments, the support layer 208 is constructed, for example, of a thermoplastic material. During operation, the support layer 208 provides damping and absorbs shocks associated with installation or operation thereby protecting the sleeve 204 and the bushing 206 from fracture.

Still referring to FIG. 3, the hybrid bearing assembly 202 also includes a protective sleeve 210 and a protective bushing 212. In various embodiments, the protective sleeve 210 and the protective bushing 212 are formed of a thermoplastic or wearable material. The protective sleeve 210 is coupled to the shaft 226 and the protective bushing 212 is coupled to the diffuser 222. In various embodiments, the protective sleeve 210 and the protective bushing 212 are coupled to the shaft 226 and the diffuser 222, respectively, via a press fit; however, in other embodiments, other methods of joining the protective sleeve 210 and the protective bushing 212 to the shaft 226 and the diffuser 222, respectively, could be utilized. For example, in various embodiments, the protective sleeve 210 and the protective bushing 212 could be joined to the shaft 226 and the diffuser 222, respectively, via an adhesive or other type of chemical bonding. The protective sleeve 210 abuts an axial end of the sleeve 204 and protects the sleeve 204 from axial loads during, for example, transportation and installation. Likewise, the protective bushing 212 abuts an axial end of the bushing 206 and the support layer 208 and thereby protects the bushing 206 and the support layer 208 from axial loads during, for example, transportation and installation. In various embodiments, a spacer 214 may be disposed between an axial end of the bushing 206 and the diffuser 222. In such embodiments, the spacer 214 is positioned at an end of the bushing 206 opposite the protective bushing 212 and prevents axial movement of the bushing 206 during installation and transportation. During operation, the protective sleeve 210, the protective bushing 212, and the spacer 214 quickly wear away and, thus, do not adversely impact the operation of the submersible pump 200.

FIG. 4 is a detail view of the hybrid bearing assembly 202 illustrating relative clearances. A first clearance 402 is established between the sleeve 204 and the bushing 206. During operation, the first clearance 402 allows rotation of the sleeve 204 within the bushing 206 while, at the same time, provides a seal against the infiltration of fluids between the sleeve 204 and the bushing 206. A second clearance 404 is established between the protective sleeve 210 and the protective bushing 212. The second clearance 404 is, for example, a few thousandths of an inch or less and is smaller than the first clearance 402. Thus, if axial or radial loads are transmitted to the hybrid bearing assembly 202, the protective sleeve 210 will contact the protective bushing 212 before the sleeve 204 contacts the bushing 206 thereby protecting the sleeve 204 and the bushing 206 from impact and possible fracture.

Figure 5B:
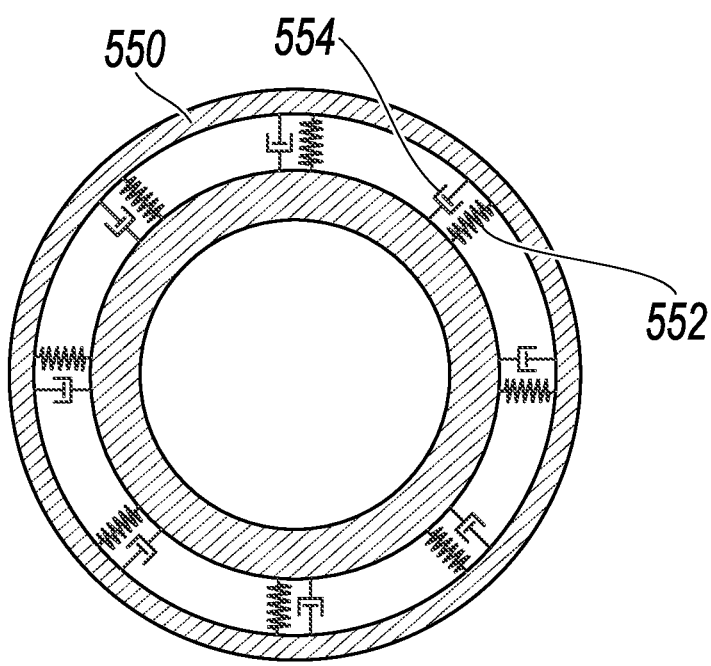
FIG. 5B is an axial view of a hybrid bearing assembly having radially-disposed spring elements and damper elements according to aspects of the disclosure.
Figure 6:
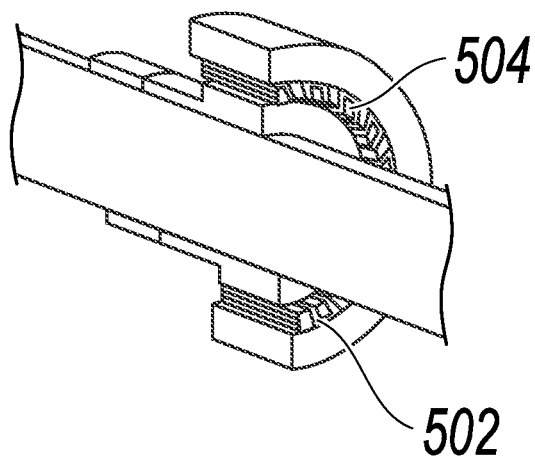
FIG. 6 is a perspective view of the hybrid bearing assembly of FIG. 5.

FIG. 5A is an axial view of a hybrid bearing assembly 500 including a vibration-absorbing element 502. FIG. 5B is an axial view of a hybrid bearing assembly 550 having spring elements 552 and damper elements 554 radially disposed around the circumference. In various embodiments, the spring elements 552 and the damper elements 554 may be, for example, independent of each other or connected. FIG. 6 is a perspective view of the hybrid bearing assembly 500. The vibration-absorbing element 502 is disposed within the support layer 504. In various embodiments, the vibration-absorbing element 502 may be, for example, a metallic spring that is embedded in an elastomer or thermoplastic filler; however, in other embodiments, the vibration-absorbing element 502 may be constructed from other materials and different configurations such as, for example, wire/polymer/metal mesh damper made or individual spring and damper elements. During operation, the vibration-absorbing element dampens vibrations associated with operation of, for example, the submersible pump 200, thereby increasing a service life of the bearing assembly 500. In various embodiments, the support layer 504 is similar to increasing the damping ratio in land-based turbomachinery by adding a flexible support with damping in series at the bearing locations such as, for example, a wire/polymer/metal mesh damper or a squeeze film damper with a squirrel cage.

Figure 7:
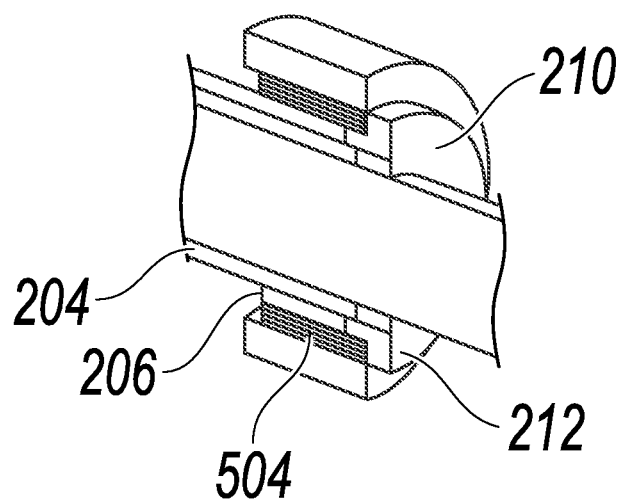
FIG. 7 is a perspective view of the hybrid bearing assembly of FIG. 5 showing the protection bushing and the protection sleeve installed according to aspects of the disclosure.

FIG. 7 is a perspective view of the hybrid bearing assembly 500 showing the protective sleeve 210 and the protective bushing 212 installed. During, for example, transport and installation, the protective sleeve 210 and the protective bushing 212 abut the sleeve 204, the bushing 206, and the support layer 504. The protective sleeve 210 and the protective bushing 212 restrict axial movement of the sleeve 204, the bushing 206, and the support layer 504 and thereby reduce the likelihood of fracture of the sleeve 204 or the bushing 206.

Figure 8A:
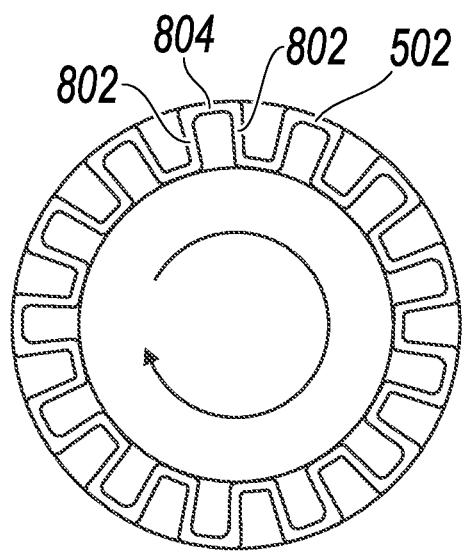
FIGS. 8A-8D are cross-sectional views illustrating various cross-sectional shapes of a vibration-absorbing element according to aspects of the disclosure.
Figure 8B:
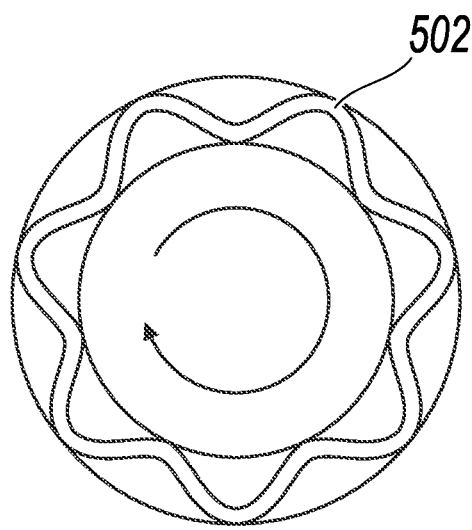
Figure 8C:
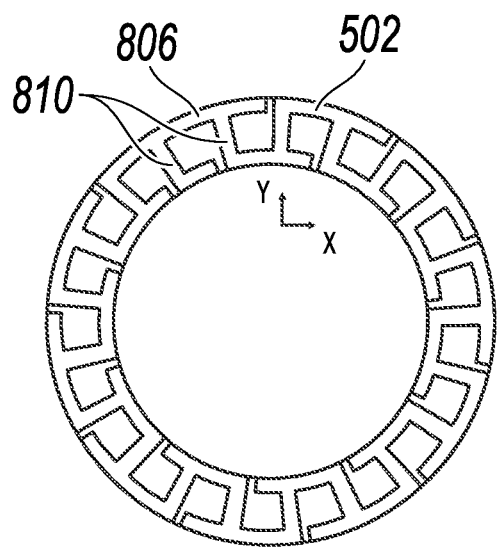
Figure 8D:
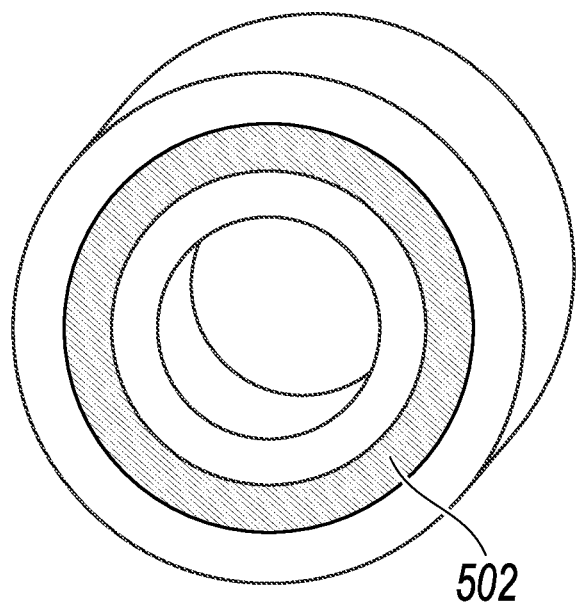

FIGS. 8A-8D are cross-sectional views illustrating various cross-sectional shapes of a vibration-absorbing element 502. In FIG. 8A it is illustrated that, in various embodiments, the vibration-absorbing element 502 may include a crenelated (box-wave) shape wherein two parallel side members 802 are joined by a top member 804. In various embodiments, the parallel sides 802 may be angled relative to a radius of the shaft 226. In FIG. 8B, it is illustrated that, in various embodiments, the vibration-absorbing element 502 may include a sinusoidal waveform shape. In FIG. 8C, it is illustrated that, in various embodiments, the vibration-absorbing element 502 may include top elements 806 and bottom elements 808 that are generally parallel to each other and joined by spanning elements 810. In various embodiments, the spanning elements 810 may be angled relative to a radius of the shaft 226. In FIG. 8D, it is illustrated that, in various embodiments, the vibration-absorbing element 502 may include a wire/polymer/metal mesh damper that includes, for example, intertwined wires that are forming a cylindrical element. The selection of the embodiments described in FIGS. 8A-8D for a particular application is a function of the required amount of stiffness and damping and the respective ratio according to the given application.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an," and other singular terms are intended to include the plural forms thereof unless specifically excluded.

What is claimed is:

1. A bearing assembly comprising:
a bushing;
a sleeve rotationally disposed within the bushing;
a support layer disposed around an outer perimeter of the bushing; and
a protective bushing disposed outwardly of the bushing in an axial direction,
wherein the protective bushing radially overlaps the bushing and the support layer, and extends radially inward farther than the bushing.

2. The bearing assembly of claim 1, wherein:
the bushing is constructed of a carbide material; and
the sleeve is constructed of the carbide material.

3. The bearing assembly of claim 1, wherein the support layer is constructed of a thermoplastic material.

4. The bearing assembly of claim 1, comprising:
a protective sleeve abutting the sleeve;
wherein the protective bushing is constructed from a thermoplastic material; and
wherein the protective sleeve is constructed from the thermoplastic material.

5. The bearing assembly of claim 1, further comprising a vibration-absorbing element disposed in the support layer.

6. The bearing assembly of claim 5, wherein the vibration-absorbing element comprises a metallic spring.

7. The bearing assembly of claim 5, wherein the vibration-absorbing element comprises a sinusoidal waveform shape.

8. The bearing assembly of claim 5, wherein the vibration-absorbing element includes a crenelated shape.

9. The bearing assembly of claim 8, wherein the vibration-absorbing element comprises parallel side members joined by a top member.

10. The bearing assembly of claim 9, wherein the side members are angled relative to a radius of a shaft.

11. A bearing assembly comprising:
a bushing disposed in an outer housing;
a sleeve rotationally disposed within the bushing;
a vibration-absorbing element disposed outwardly of the bushing; and
a protective bushing disposed outwardly of the bushing in an axial direction,
wherein the protective bushing radially overlaps the bushing and the vibration-absorbing element, and extends radially inward farther than the bushing.

12. The bearing assembly of claim 11, wherein the vibration-absorbing element comprises a plurality of spring elements and a plurality of damper elements disposed about a circumference of the vibration-absorbing element.

13. The bearing assembly of claim 11, comprising:
a protective sleeve abutting the sleeve.

14. The bearing assembly of claim 13, wherein the vibration-absorbing element is disposed in a support layer.

15. The bearing assembly of claim 11, wherein the vibration-absorbing element comprises a metallic spring.

* * * * *